(12) United States Patent
Gandhi

(10) Patent No.: US 8,196,960 B2
(45) Date of Patent: Jun. 12, 2012

(54) KNEE BELT RESTRAINT

(75) Inventor: Umesh N. Gandhi, Farmington Hills, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 82 days.

(21) Appl. No.: 12/833,078

(22) Filed: Jul. 9, 2010

(65) Prior Publication Data
US 2012/0007409 A1    Jan. 12, 2012

(51) Int. Cl.
*B60R 22/00* (2006.01)
(52) U.S. Cl. .................. 280/801.1; 297/468; 297/485
(58) Field of Classification Search .............. 242/374; 280/733, 748, 751, 801.1, 806, 807, 808; 297/468, 473, 474, 478, 480, 483, 485
See application file for complete search history.

(56) References Cited

U.S. PATENT DOCUMENTS

| | | | | |
|---|---|---|---|---|
| 3,262,716 A | * | 7/1966 | Graham | 280/751 |
| 3,840,248 A | | 10/1974 | Fiala | |
| 3,871,470 A | * | 3/1975 | Schwanz et al. | 297/480 |
| 4,482,187 A | * | 11/1984 | Nagashima et al. | 297/468 |
| 4,902,037 A | | 2/1990 | Groce | |
| 5,257,854 A | * | 11/1993 | Korneliussen | 297/468 |
| 6,565,120 B2 | * | 5/2003 | Ganesan | 280/801.1 |
| 6,837,547 B2 | * | 1/2005 | Delventhal et al. | 297/484 |
| 7,059,445 B2 | * | 6/2006 | Higuchi et al. | 180/268 |
| 7,552,943 B2 | * | 6/2009 | Pal et al. | 280/751 |
| 7,581,757 B2 | * | 9/2009 | Clute | 280/806 |
| 2004/0178668 A1 | * | 9/2004 | Kassai et al. | 297/250.1 |

FOREIGN PATENT DOCUMENTS

| | | | |
|---|---|---|---|
| JP | 55004265 A | | 1/1980 |
| JP | 55004265 A2 | | 1/1980 |
| JP | 63222956 A | * | 9/1988 |
| JP | 2004323008 A | | 11/2004 |
| JP | 2004323008 A2 | | 11/2004 |
| JP | 2006273167 A | * | 10/2006 |

* cited by examiner

*Primary Examiner* — Paul N Dickson
*Assistant Examiner* — Laura Freedman
(74) *Attorney, Agent, or Firm* — Gifford, Krass, Sprinkle, Anderson & Citkowski, P.C.

(57) ABSTRACT

A three-point seat belt assembly for an occupant sitting in a seat of a motor vehicle is provided. The three-point seat belt assembly can include a seat belt web that has a shoulder harness portion and a knee portion. The shoulder harness portion extends across the occupant's torso and the knee portion extends across the occupant's knees. In addition, a guide member can be included that prevents the knee portion of the seat belt web from sliding up above the occupant's knees and sliding down towards the occupant's shins. A pretensioner can further be included and be attached to the seat belt web. The pretensioner can have a release force of between 5 and 6 kilonewtons which is an improvement over current limits of between 2 and 3 kilonewtons.

15 Claims, 3 Drawing Sheets

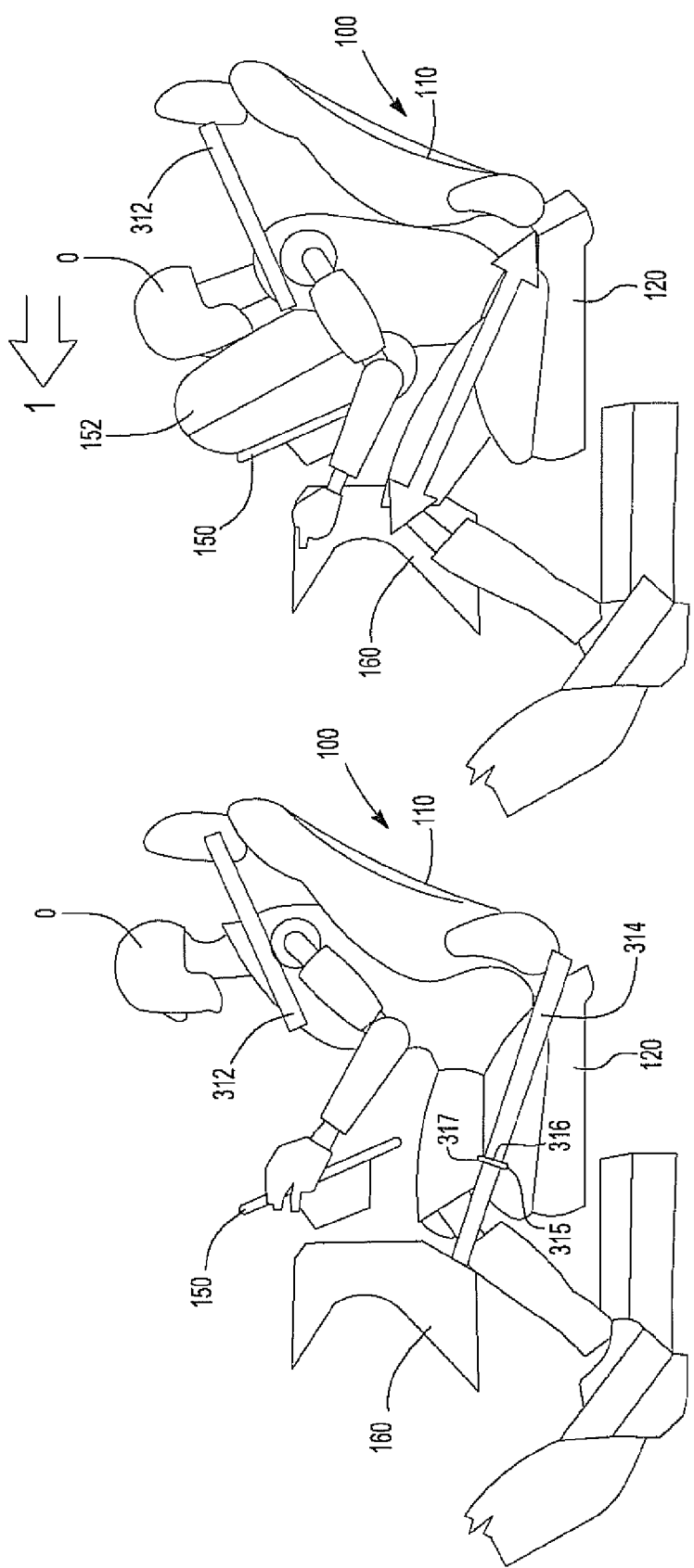

KNEE BELT RESTRAINT

FIELD OF THE INVENTION

The present invention is related to a three-point seat belt assembly for a motor vehicle. In particular, the present invention is related to a three-point seat belt assembly having a knee portion that extends across an occupant's knees and provides improved occupant protection in the event of the motor vehicle has a frontal impact.

BACKGROUND OF THE INVENTION

Seat belts are known to have two basic functions during a motor vehicle accident. The first function is a restriction of movement for an occupant wearing the seat belt and the second function is dispersion or dissipation of energy in as safe a manner as possible during the accident. Stated differently, seat belts, and other vehicle safety equipment such as airbags, are designed to restrict the movement of the occupant(s) within the motor vehicle during an accident and prevent or lessen the severity of impact between the occupant(s) and other objects within the interior of the vehicle.

Several types of seat belts are used, or have been used, in modern cars and trucks. Three common types of seat belts are lap belts that extend across an occupant's lap, shoulder belts that extend across an occupant's torso, and combination lap and shoulder belts. Seat belts can also be described by the number of "anchor points" used to attach the seat belt to the vehicle. For example, a lap belt can be referred to as a "two-point" seat belt that is anchored at two locations within the vehicle and on opposite sides of the occupant's hips. In addition, the anchor points can include the seat structure, the occupant's door, vehicle floor and the like. Also, a lap and shoulder belt can be known as a "three-point" seat belt that has two anchor points on opposite sides of an occupant's hips and one anchor point on a frame of the vehicle proximate a shoulder of the occupant, e.g. a B pillar.

Presently, U.S. federal law requires that manufacturers provide three-point safety belts that have a lap belt portion and a shoulder harness portion for all seats in new motor vehicles. As stated above, the lap belt portion extends across the lap of the occupant while the shoulder harness portion typically extends diagonally across a torso of the occupant. In addition, a pretensioner is typically provided, the pretensioner pulling the seat belt tight in the event of a collision and thereby taking up any extra slack and reducing any force the occupant's body is subjected to during the collision.

The pretensioner typically has a force or load limit at which it will allow at least part of the seat belt to slip or extend therefrom in order to disperse or dissipate energy during the collision. For example, current pretensioners have a force or load limit generally between 2 and 3 kilonewtons, which is a function of the force a hip and/or lower spine of an average individual can withstand without serious injury. Once the limit exceeded, the pretensioner affords for in slippage or extension of at least a portion of the seat belt therefrom, which results in the occupant moving forward in the event of a front-end collision and possibly impacting another energy absorber device such as a front airbag, collapsible dashboard, etc.

If a seat belt could have a higher pretensioner force or load limit and not result in serious injury to the occupant's hips, lower spine, etc., forward movement of the occupant during a front-end collision could be reduced and thereby result in a less forceful impact between the occupant and the front airbag, collapsible dashboard, etc. Therefore, a seat belt assembly that provides a higher pretensioner force or load limit without serious injury to an occupant wearing the seat belt assembly would be desirable.

SUMMARY OF THE INVENTION

A three-point seat belt assembly for an occupant sitting in a seat of a motor vehicle is provided. The three-point seat belt assembly can include a seat belt web that has a shoulder harness portion and a knee portion. The shoulder harness portion extends across the occupant's torso and can be attached to a pretensioner that has a force or load limit of generally 5 to 6 kilonewtons (kN). In addition, a guide member can be included that prevents the knee portion of the seat belt web from sliding up above the occupant's knees and sliding down towards the occupant's shins. In some instances, the guide member can be attached to the seat and may or may not be attached to a bottom portion of the seat. The guide member can be a flexible member and may or may not have a generally C-shape.

During operation, an occupant sits in a motor vehicle seat and pulls upon the seat belt web in a known manner such that the shoulder harness portion moves or extends across the occupant until a belt clip or latch is attached to a latch anchor point. Either before, during, or after the seat belt web is attached to the latch anchor point, the knee portion of the seat belt web is placed and/or extended across the occupant's knees. In addition, the guide member affords for proper placement of the knee portion across the occupant's knees and in the event of a front-end collision, the occupant is restrained from moving by the shoulder harness portion extending across the occupant's torso and the knee portion extending across the occupant's knees.

BRIEF DESCRIPTION OF THE DRAWINGS

FIG. 2B is a side view of an anthropomorphic test device (ATD) using the three-point seat belt assembly shown in FIG. 2A; and FIG. 2C is a side view of FIG. 2A during a frontal impact.

DETAILED DESCRIPTION OF THE PRESENT INVENTION

The present invention provides a three-point seat belt assembly that affords improved occupant protection during a frontal impact. As such, the present invention has utility as a safety component for a motor vehicle.

The three-point seat belt assembly can include a seat belt web that has a shoulder harness portion and a knee portion. In some instances, a lap portion can optionally be included. The shoulder harness portion can extend across the occupant's torso and the knee portion can extend across the occupant's knees when it is in an in-use position. A guide member can further be included, the guide member preventing the knee portion of the seat belt web from sliding up above the occupant's knees and/or sliding down from the occupant's knees toward the occupant's shins once the occupant has fastened the seat belt as known to those skilled in the art. A pretensioner can be attached to the seat belt web, the pretensioner having a release force of greater than 4 kN which is appreciated to be an improvement over the current limit of 2-3 kN. In some instances, the release force is generally between 5 and 6 kN.

Figure 1A:
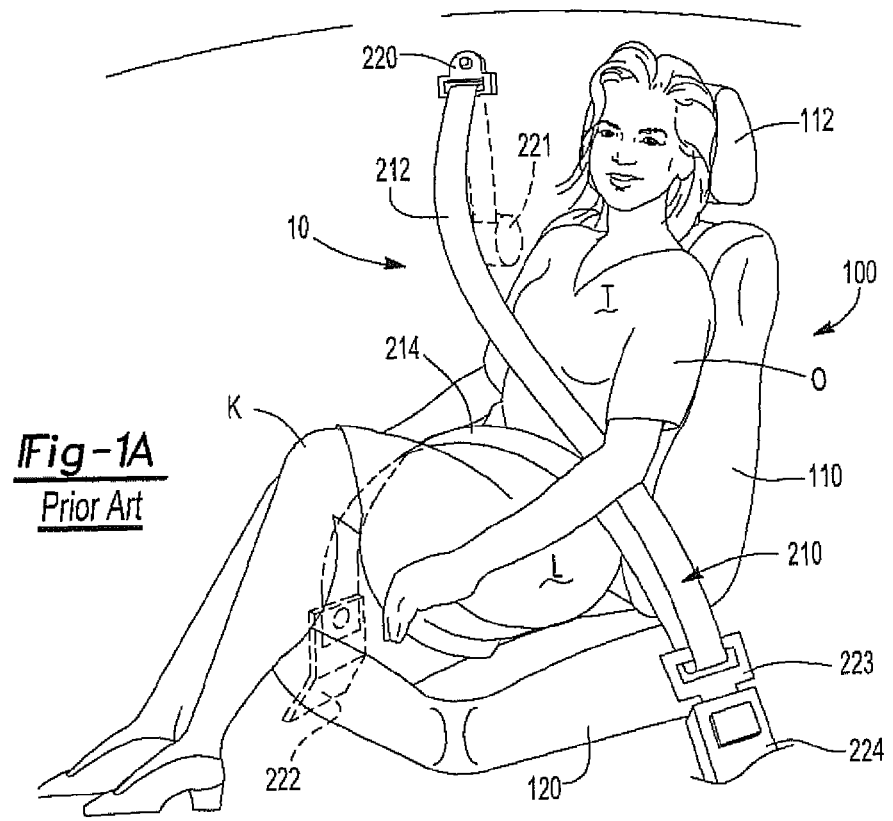
FIG. 1A is a perspective view of an occupant using a three-point seat belt assembly according to a prior art embodiment.

Turning now to FIG. 1A, a prior art embodiment of a three-point seat belt assembly is shown generally at reference numeral 10. The three-point seat belt assembly 10 can have a seat belt web 210 that has a shoulder harness portion 212 and a lap portion 214. In addition, the seat belt assembly 10 can have a first anchor point 220, a second anchor point 222, and a third anchor point 224. Proximate to the first anchor point 220 can be a pretensioner 221 that pulls the seat belt web 210 tight in the event of a collision as is known to those skilled in the art.

The occupant O can be seated in a seat 100 that has an upright or upper portion 110 and a sitting or lower portion 120. In addition, the seat 100 may or may not have a headrest portion 112. It is appreciated that it is known to those skilled in the art that the occupant O can sit in the motor vehicle seat 100 and grasp the seat belt assembly 10 by a latch portion 223, pull the latch portion 223 across the occupant's torso T and lap L, and then latch the latch portion 223 to the third anchor point 224. In this manner, the occupant O can sit in a motor vehicle and fasten the seat belt assembly 10 in order to have improved safety during operation of a motor vehicle.

Figures 1B, 1C:
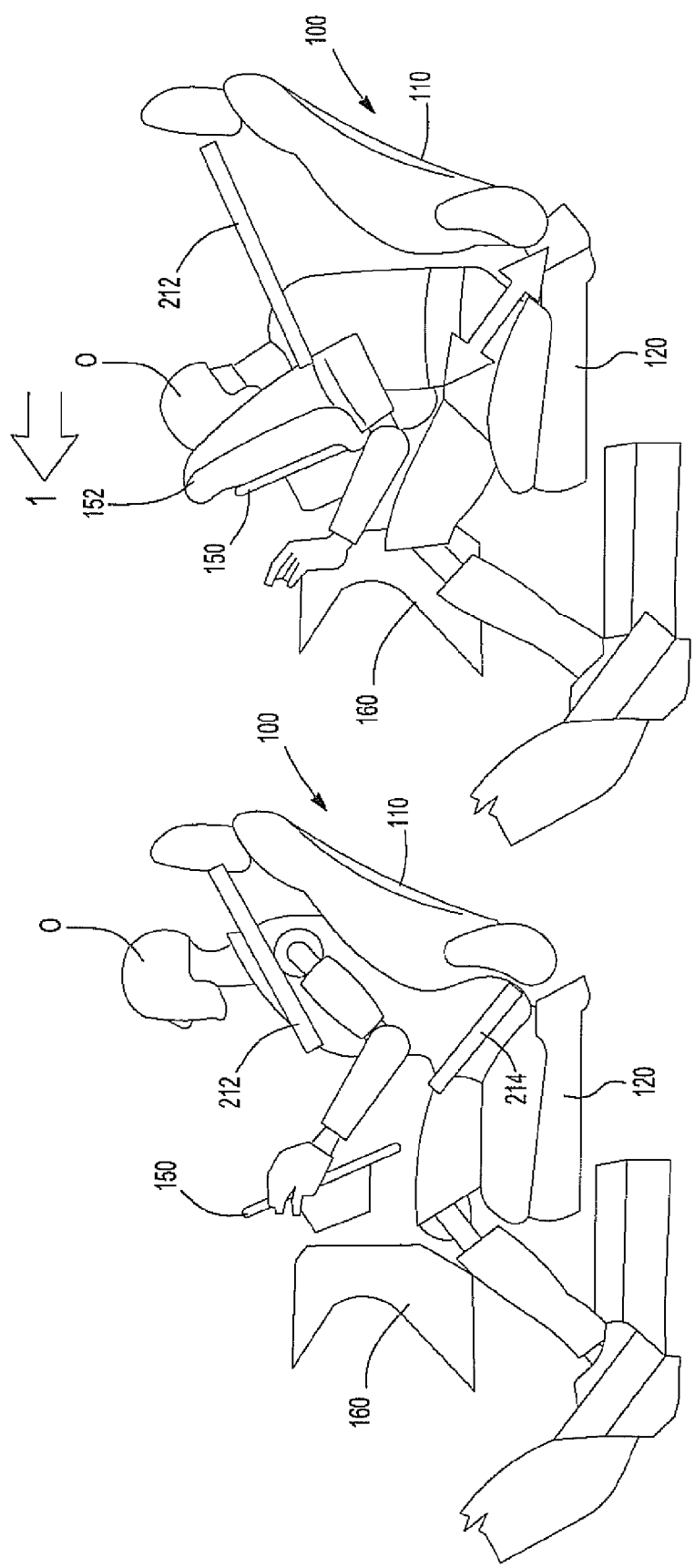
FIG. 1B is a side view of an anthropomorphic test device (ATD) using the three-point seat belt assembly shown in FIG. 1A.
FIG. 1C is a side view of FIG. 1B during a frontal impact.

FIGS. 1B and 1C provide a side view of the occupant shown in FIG. 1A both before and during a frontal impact, the occupant O in the form of an anthropomorphic test device (ATD). As shown in FIG. 1B, the occupant is sitting in the seat 100 while wearing the three-point seat belt assembly 10 in a proper manner. In the event of a frontal impact, the occupant O will be thrust in a forward direction 1 with the occupant's movement restrained by the three-point seat belt assembly 10 and possibly other safety features such as a steering wheel airbag 152 extending from a steering wheel 150. In addition, a dashboard panel 160 may or may not be employed to reduce injury in the event that the occupant O's knees K contact therewith. As stated above, it is appreciated that the pretensioner 221 has a force or load limit that is a function of known load or impact limiting characteristics for the hip and/or lower spine portions of an average occupant O. For example and for illustrative purposes only, the force or load limit can be between 2 and 3 kN with forces greater than this affording for slip and/or extension of the seat belt web 210 from the pretensioner 221 and additional forward movement of the occupant O.

Figure 2A:
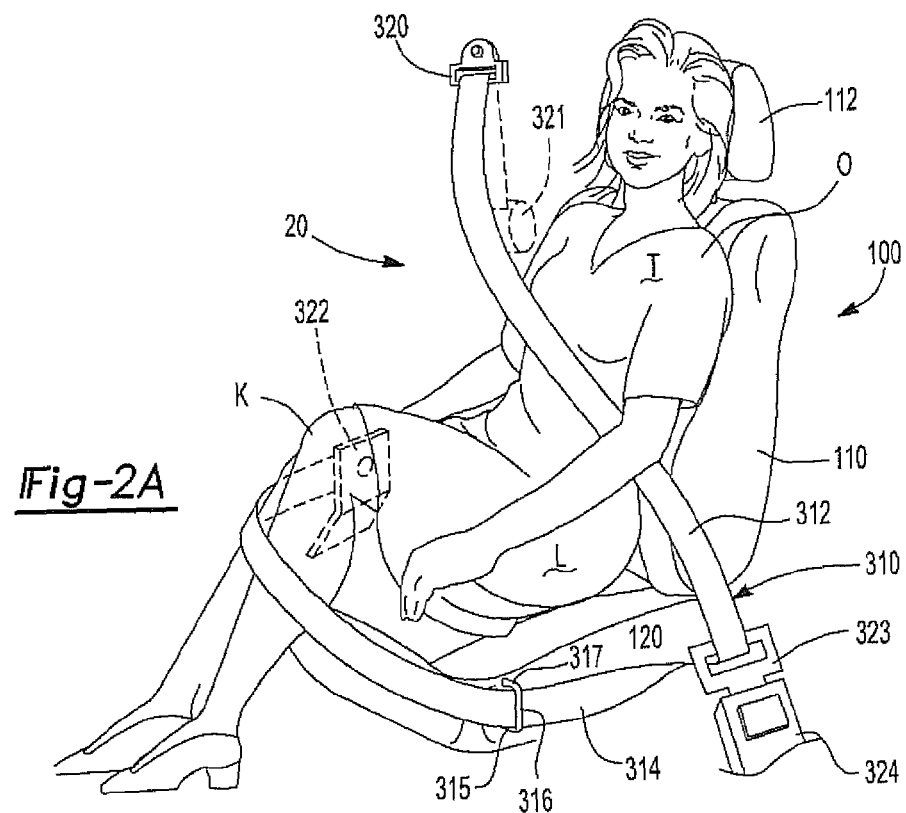
FIG. 2A is a perspective view of an occupant wearing a three-point seat belt assembly according to an embodiment of the present invention.

Referring now to FIG. 2A, a three-point seat belt assembly according to an embodiment of the present invention is shown generally at reference numeral 20. The three-point seat belt assembly 20 can have a seat belt web 310 with a torso portion 312 and a knee portion 314. A guide member 316 can be included that affords for the knee portion 314 staying located along the occupant's knees K. The guide member 316 can have a first end 315 that is attached to the seat 100 and a second end 317 that is not attached to the seat 100. In some instances, the guide member 316 is a C-shaped member, the first end 315 is fixedly attached to the sitting portion 120, the second end 317 is not attached to the seat 100 and/or the second end is releasably attached to the seat 100. It is appreciated from FIG. 2A that the sitting portion 120 can have a front half portion and a rear half portion, and that the guide member 316 can be directly attached to the front half portion of the sitting portion 120. In addition, the guide member 316 may or may not be a flexible member that can be easily bent and/or manipulated to allow for the knee portion 314 to slide and/or fit between the sitting portion 120 of the seat 100 and the member 316.

Similar to the embodiment shown in FIG. 1A, the seat belt assembly 20 has a first anchor point 320, a second anchor point 322, and a third anchor point 324. In addition, a pretensioner 321 can be provided and attached to the seat belt web 310. However, with the seat belt web 310 having the knee portion 314 extending across the knees K of the occupant O, the force or load limit of the pretensioner 321 can be greater than the force or load limit for the pretensioner 221.

During use, the occupant O can sit on the seat 100 and grasp the latch portion 323, pull the latch portion across the torso T, lap L or knees K, and snap or latch the latch portion 323 to the third anchor point 324. It is appreciated that the knee portion 314 can be placed across the knees K of the occupant before, during, or after the latch portion 323 is attached to the anchor point 324.

The guide member 316 can be a flexible member and may or may not be generally C-shaped. The guide member 316 can have a first end that is attached to the seat and a second end that is releasably attached to the seat or is not attached to the seat. In some instances, the guide member 316 is attached to the sitting or lower portion 120 of the seat 100. As shown in FIG. 2A, the knee portion 314 of the seat belt web 310 can slide within the guide member 316 for proper placement of the knee portion 314 relative to the occupant's knees K. Although not shown, an additional guide member 316 can be located proximate to the first anchor point 322 on an opposite side of the lower portion of the seat 120, however this is not required. It is appreciated that the knee portion 314, the shoulder portion 312, and the pretensioner 321 provide enough slack and/or tension on the seat belt web 310 in order for the occupant O to move their feet and/or legs in order to operate a motor vehicle. Stated differently, the three-point seat belt assembly 20 does not interfere with the safe operation and/or driving of a motor vehicle.

Turning now to FIGS. 2B and 2C, the embodiment shown in FIG. 2A is shown from a side view both before impact (FIG. 2B) and during impact (FIG. 2C) with the occupant O in the form of an ATD. As shown in FIG. 2B, the occupant O is generally in the same position as the occupant shown in FIG. 1B. However, during and/or after a frontal impact of the motor vehicle, the higher force or load limit on the pretensioner 321 affords for less forward movement of the occupant O and thus a reduced impact force between the occupant O and the front airbag 152 and/or dashboard 160. The force or load limit of the pretensioner 321 is a function of known load or impact characteristics of knees and/or femurs for an average occupant O, which is known by those skilled in the art to be able to withstand higher loads and forces than the hip and/or lower spine regions without serious injury. For example and for illustrative purposes only, the load or force limit of the pretensioner 321 can be generally between 5 and 6 kN. In this manner, the three-point seat belt assembly 20 provides increased restraint and protection for an occupant during a frontal impact when compared to the seat belt assembly 10.

It is appreciated from the figures that the three-point seat belt assembly 20 can be especially useful for a pregnant woman sitting in a motor vehicle seat since the use of the knee portion 314 instead of the lap portion 214 affords for no loading or force on the abdomen of the pregnant woman while using the seat belt assembly 20, especially during an accident.

It is further appreciated that a seat belt assembly according to an embodiment of the present invention can afford a dual use or dual purpose seat belt in that the knee portion can be also be used as a lap portion. For example and for illustrative purposes only, the seat belt assembly 20 can be used by pulling the latch portion 323 across an occupant's body and latched or attached to the third anchor point 324 with the knee portion 314 extending across the lap L of the occupant. In this manner, the seat belt assembly 20 can be used as a traditional 3-point seat belt assembly. However, the occupant can also release or pull more seat belt web 310 from the pretensioner 321 and move the knee portion 314 from the lap L to across his or her knees K. In this manner, the inventive seat belt assembly is used as described.

The invention is not restricted to the illustrative embodiments described above. The embodiments are not intended as limitations on the scope of the invention. Methods, processes, apparatus, and the like described herein are exemplary and not intended as limitations on the scope of the invention. Changes therein and other uses will occur to those skilled in the art. The scope of the invention is defined by the scope of the claims.

I claim:

1. A three-point seat belt assembly for an occupant sitting in a seat of a motor vehicle, the three-point seat belt assembly comprising:
    a seat for the occupant to sit on, said seat having an upper portion and a lower portion, said lower portion having a front half portion and a rear half portion:
    a seat belt web having a shoulder harness portion and a knee portion, said shoulder harness portion extendable across the occupant's torso and said knee portion extendable across the occupant's knees; and
    a guide member directly attached to said front half portion of said lower portion of said seat, said seat belt web extending through said guide member to an anchor, said guide member operable to prevent said knee portion of said seat belt web from sliding up above the occupant's knees and sliding down toward the occupant's shins.

2. The seat belt assembly of claim 1, wherein said guide member is a flexible member.

3. The seat belt assembly of claim 1, wherein said guide member is a generally C-shaped member.

4. The seat belt assembly of claim 3, wherein said generally C-shaped member has a first end fixedly attached to the seat and a second end releasably attached to the seat.

5. The seat belt assembly of claim 3, wherein said generally C-shaped member has a first end fixedly attached to the seat and a second end not attached to the seat.

6. The seat belt assembly of claim 1, further comprising a pretensioner attached to said seat belt web, said pretensioner having a release force of greater than 4 kilonewtons.

7. The seat belt assembly of claim 6, wherein said release force is generally between 5 and 6 kilonewtons.

8. A three-point seat belt assembly for an occupant sitting in a seat of a motor vehicle, the three-point seat belt assembly comprising:
    a seat for the occupant to sit on, said seat having a sitting portion with a front half portion and rear half portion;
    a seat belt web having a shoulder harness portion and a knee portion, said shoulder harness portion extendable across the occupant's torso and said knee portion extending from said shoulder harness portion and extendable across the occupant's knees; and
    a guide member directly attached to said front half portion of said seat sitting portion and operable to prevent said knee portion of said seat belt web from sliding up above the occupant's knees and sliding down toward the occupant's shins when said three-point seat belt assembly is in use.

9. The seat belt assembly of claim 8, wherein said guide member is a flexible member.

10. The seat belt assembly of claim 8, wherein said guide member is a generally C-shaped member.

11. The seat belt assembly of claim 10, wherein said generally C-shaped member has a first end fixedly attached to the seat and a second end releasably attached to the seat.

12. The seat belt assembly of claim 10, wherein said generally C-shaped member has a first end fixedly attached to the seat and a second end not attached to the seat.

13. The seat belt assembly of claim 8, further comprising a pretensioner attached to said seat belt web, said pretensioner having a release force of greater than 4 kilonewtons.

14. The seat belt assembly of claim 13, wherein said release force is generally between 5 and 6 kilonewtons.

15. A three-point seat belt assembly for an occupant sitting in a seat of a motor vehicle, the three-point seat belt assembly comprising:
    a seat for the occupant to sit on, said seat having an upper portion and a lower portion, said lower portion having a front half portion and a rear half portion;
    a seat belt web extendable across the occupant's knees; and
    a guide member directly attached to said front half portion of said lower portion of said seat, said seat belt web extending through said guide member to an anchor, said guide member operable to prevent said knee portion of said seat belt web from sliding up above the occupant's knees and sliding down toward the occupant's shins.

* * * * *